L. H. SOISSON.
GAGE DEVICE.
APPLICATION FILED MAY 24, 1915.
1,188,018. Patented June 20, 1916.
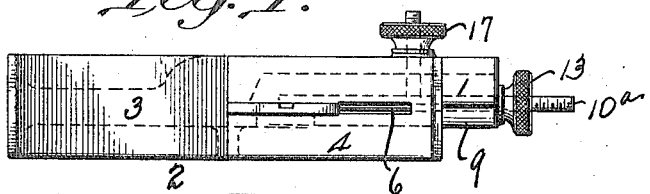
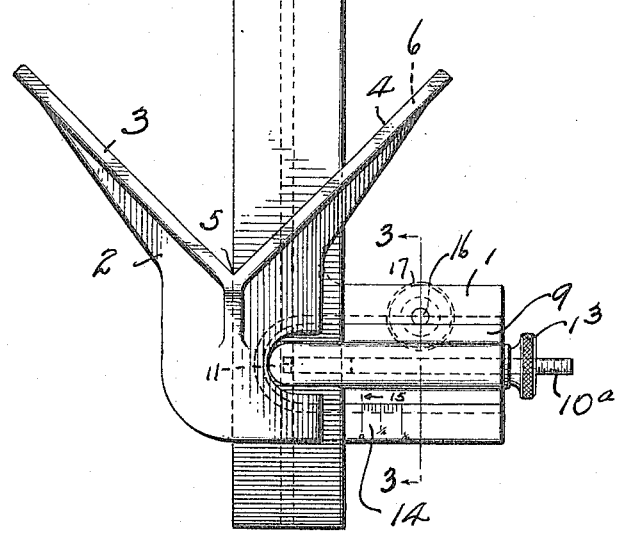
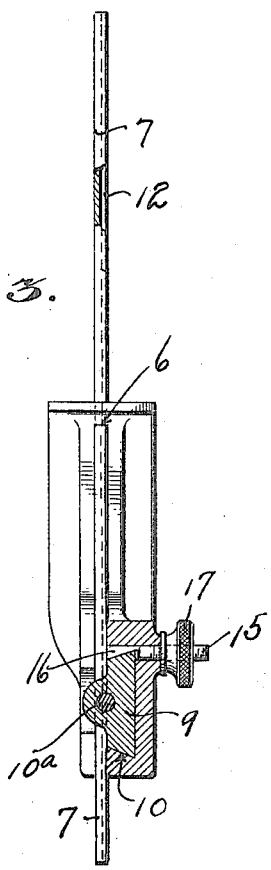
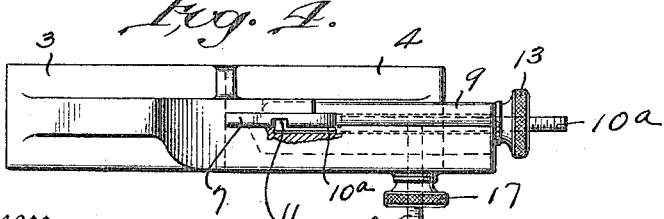
Witness
Inventor
LOUIS H. SOISSON
By
his Attorney

UNITED STATES PATENT OFFICE.

LOUIS H. SOISSON, OF SCOTTDALE, PENNSYLVANIA.

GAGE DEVICE.

1,188,018.   Specification of Letters Patent.   Patented June 20, 1916.

Application filed May 24, 1915. Serial No. 30,129.

*To all whom it may concern:*

Be it known that I, LOUIS H. SOISSON, a citizen of the United States, residing at Scottdale, in the county of Westmoreland and State of Pennsylvania, have invented certain new and useful Improvements in Gage Devices, of which the following is a specification.

This invention relates to tools or devices for accurately gaging various objects to determine the true center thereof or an off-center point in a rapid and reliable manner, and without difficulty.

In order to readily locate the center of shafts, bars, and similar objects of cylindrical or square cross section, it is desirable to have a device in which the end of the same may be laid so that with the aid of a scale or suitable measuring and gaging device, the center of the object may be readily determined.

To this end the invention contemplates a novel, practical and substantial device which may be easily manipulated and accurately adjusted to suit the particular requirements of each case.

A further object of the invention is to provide for lateral as well as vertical adjustment of the scale or gage, thus providing for moving the same off center when necessary to obtain certain other measurements desired.

With the above and other objects in view which will more readily appear as the nature of the invention is better understood, the same consists in the novel construction, combination and arrangement of parts hereinafter more fully described, illustrated and claimed.

In the embodiment disclosed in the accompanying drawings Figure 1 is a top plan view of the present device. Fig. 2 is a front elevation. Fig. 3 is a vertical section on the line 3—3 of Fig. 2. Fig. 4 is a bottom plan view, with a portion thereof in section, to show the engagement of the scale clamping pin with the scale.

Similar reference characters designate corresponding parts throughout the several figures of the drawings.

Referring to the features of the invention, shown in the accompanying drawings, it will be observed by reference thereto that the numeral 1 designates a tool body having formed at one side thereof a rest member 2. This body and rest member are preferably cast integral, and the body portion 1 is offset from the transverse center of the rest portion to provide the proper scale clearance, as will be apparent from Fig. 3. The said rest member 2 essentially includes the oppositely inclined arm members 3 and 4 which meet as at 5, thus providing a substantially V-shaped head which forms a socket for receiving the end of the object to be gaged. The arm member 4 is provided with a central slot 6 which receives a vertically and laterally adjustable scale or gage member 7, having its edge 8 normally coincident with the meeting point or apex 5 of the arms 3 and 4, and being capable of adjustment through the rest, *i. e.* parallel to a line bisecting the angle formed by the arms 3 and 4. By arranging the slot and scale in the center of the arm 4 it is possible for a piece of work to be operated upon from either side of the tool, since a resting ledge is provided on each side of the scale as may be observed from Fig. 2.

The shifting of the scale or gage members 7 off center, or so that the edge 8 is moved from the point 5 is made possible by means of a scale carrier 9 slidable in the guideway 10 of the body portion. This scale carrier is designed to bodily carry the scale 7, and clampingly holds the same thereto by means of a clamping pin 10$^a$. By reference to Figs. 2 and 4, it will be observed that this clamping pin 10$^a$ is provided at one end with an offset scale engaging lug 11 which seats in a longitudinal groove 12 of the scale, and has at its other end a clamping nut 13. When this clamping nut 13 is loosened, the lug 11 releases the scale 7 so that the same may be vertically adjusted, and when the said nut is screwed tight against the end of the scale carrier, the scale is clamped thereto. Thus, the scale may be readily moved with the scale carrier to effect an off-center adjustment. The lower face of the body 1 adjacent the scale carrier 9 is preferably provided with a scale or suitable graduations 14, which when read in connection with the fixed mark 15 on the scale carrier will accurately designate whether the edge 8 of the scale is on its true center or off-center, and how much.

When using the off-center adjustment, it is desirable that the scale carrier 9 may be positively locked in its adjusted off-center position, and to provide for this, the body 1 has a carrier clamping pin 15, one end 16 of which engages with one of the side edges of the carrier 9. This clamping pin 15 is provided with a clamping nut 17 which makes it possible to draw the pin into such a position that the wedge face thereof will bind against the edge of the sliding scale carrier and lock it in position.

From the foregoing, it is thought that the many features, advantages, and operation of the invention will be readily apparent without further description, and it will be understood that changes in the form, proportion and minor details of construction may be resorted to without departing from the spirit of the invention or scope of the appended claims.

I claim:

1. A center gage comprising a rest member, including oppositely inclined rigid arms, one of said arms having a slot, a tool body formed at the apex of said arms having the major portion thereof disposed at one side of the apex, a guideway in said tool body, a scale movable in said slot in one of the inclined arms, and a scale carrier having means for clamping the scale thereto and slidable in said guideway.

2. A center gage comprising a rest member including oppositely inclined rigid arms, one of said arms having a slot, a tool body formed at the apex of said arms and having the major portion thereof disposed at one side of said apex, a guideway in said tool body, a scale movable in said slot in one of the inclined arms, and a scale carrier having means for clamping the scale to permit the same to move vertically, said scale carrier being slidable in said guideway in the tool body.

3. A center gage comprising a rest member including oppositely inclined arms, one of said rigid arms having a slot, a tool body formed at the apex of said arms and having the major portion thereof disposed at one side of the apex, a guideway in said tool body, a scale movable in the slot of one of said arm members, a scale carrier slidable in the guideway in the tool body, a clamping pin carried by the scale carrier having means at one end for releasably engaging said scale, and a clamping member disposed transversely of the tool body and having means for engaging the slidable carrier.

4. A center gage comprising a rest member including oppositely inclined arms, one of said rigid arms having a slot, a tool body formed at the apex of said arms and disposed at one side of said apex, a guideway in said tool body, a scale movable in the slot of one of said arm members, a scale carrier slidable in the guideway in the tool body, a clamping pin carried by the scale carrier having means at one end for releasably engaging said scale, and a clamping member disposed transversely of the tool body and having means for engaging the slidable carrier.

5. A center gage comprising a rest member including oppositely inclined rigidly connected arms, one of said arms having a central longitudinal slot, a tool body formed integral with said rigid arms at the apex thereof and disposed on the same side of the apex as the arm member having said slot, a guideway in said tool body, a scale movable in said slot, and a scale carrier slidable in said guideway and having means for clampingly engaging said scale.

In testimony whereof I hereunto affix my signature in the presence of two witnesses.

LOUIS H. SOISSON.

Witnesses:
G. L. BROWN,
KATHRYN PHELAN.

Copies of this patent may be obtained for five cents each, by addressing the "Commissioner of Patents, Washington, D. C."